C. A. ANDERSON.
GAUGE GLASS GUARD.
APPLICATION FILED NOV. 5, 1921.

1,434,645.

Patented Nov. 7, 1922.

Inventor
Chris A. Anderson

By Watson E. Coleman Attorney

Patented Nov. 7, 1922.

1,434,645

UNITED STATES PATENT OFFICE.

CHRIS A. ANDERSON, OF WATERTOWN, SOUTH DAKOTA.

GAUGE-GLASS GUARD.

Application filed November 5, 1921. Serial No. 513,084.

*To all whom it may concern:*

Be it known that I, CHRIS A. ANDERSON, a citizen of the United States, residing at Watertown, in the county of Codington and State of South Dakota, have invented certain new and useful Improvements in Gauge-Glass Guards, of which the following is a specification, reference being had to the accompanying drawings.

This invention relates to protectors or guards for gauge glasses and more particularly to a guard for use in connection with a water gauge glass such as used on boilers.

It is an object of the invention to provide a device of this character in the form of a transparent member which eliminates damage to a large extent by confining the explosion or breakage of the water glass within the guard and at the same time permits the engineer to readily observe the gauge glass through the guard.

It is another object of the invention to provide a guard of this character which can be removed very rapidly to permit access to a gauge glass for repairs.

It is also an object of the invention to provide a protector of this character including a pair of holding members, each being provided with a series of openings whereby the water and steam may be permitted to escape and lessen the force of the explosion which usually follows the breaking of a gauge glass.

It is a further object of the invention to provide a guard of this character capable of being applied to the conventional types of gauge glasses now in use as the holding means of the guard are adapted to engage the stuffing boxes of the glass.

It is still a further object of the invention to provide a guard of this character including a pair of holding plates, one of said plates having a socket for the reception of the guard, the remaining plate being adapted to extend within the guard and having a band secured thereto for engagement with the exterior face of the guard whereby the guard may be removed from between the supports of the gauge glass without removing either of the holding plates from their supports.

With these and other objects in view, the invention consists in the improved construction and arrangement of parts to be hereinafter more particularly described, fully claimed and illustrated in the accompanying drawings, in which:—

Figure 1:
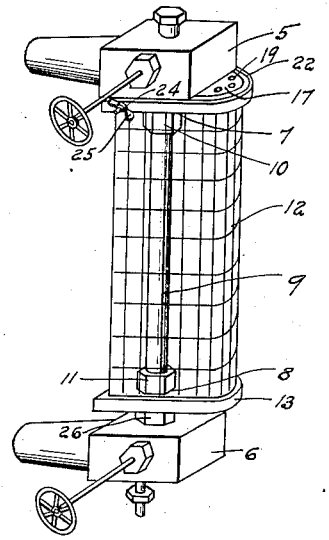
Figure 1 is a perspective view of a gauge glass guard constructed in accordance with an embodiment of the invention.
Figure 2:
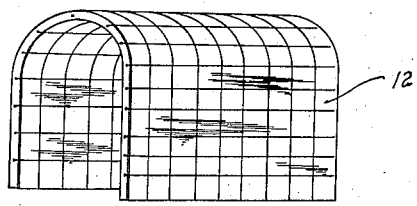
Figure 2 is a perspective view of the guard removed.
Figure 3:
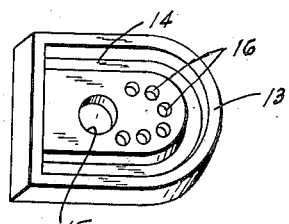
Figure 3 is a perspective view of the lower supporting plate.
Figure 4:
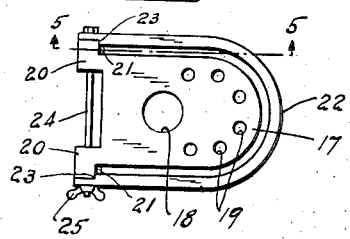
Figure 4 is a top plan view of the upper supporting plate.
Figure 5:
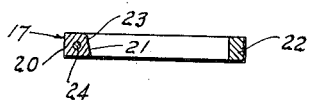
Figure 5 is a section taken on the line 5—5 of Figure 4.

Referring to the drawings, 5 designates the upper support of a gauge glass and 6 the lower support, said supports being connected to a boiler in the well known manner, each support serving as a casing for a valve. The supports are also provided with stuffing boxes 7 and 8 adapted to receive a gauge glass 9, securing nuts 10 and 11 being used to hold the ends of the gauge glass in the proper position within the stuffing boxes. The structure above described is common to the popular type of gauge glasses and forms no part of the invention.

It has been found that upon the breaking of a gauge glass that considerable confusion and damage results in view of the explosion and the escape of water and steam which follows, rendering the repair of the gauge glass difficult and causing considerable delay. In order to overcome this disadvantage, a novel form of guard or protector 12 is provided, said guard consisting of tempered plate glass ribbed and reinforced by wire, the glass being transparent so as to permit the gauge glass 9 to be readily observed. The glass is formed substantially U-shaped with its ends open.

A holding member or plate 13 is provided, said holding member consisting of a plate constructed in accordance with the shape of the U-shaped guard and having a substantially U-shaped channel 14 formed in one face thereof, for the reception of one end of the guard. The intermediate portion of the plate is provided with a relatively large opening 15 adapted to receive the stuffing box 8, while disposed between the opening 15 and the forward portion of the channel 14 is a series of relatively small openings 16 which serve as outlets for water. A second holding member 17 is provided, said member consisting of a plate constructed to conform to the U-shaped guard and adapted to engage the inner surface of the guard at one end. The intermediate portion of the plate 17 is provided with an opening 18 adapted to receive the stuffing box 7 of the upper support, while a series of openings 19 are provided in the plate between the opening in the edge of the plate to provide outlets for the escape of fluid, such as steam. In order to permit the guard to be quickly applied and removed, the plate 17 is provided with a pair of lugs 20 formed on its rear end, said lugs projecting beyond the edges of the plate and being slightly greater in thickness than the thickness of the glass of the guard. The front faces 21 of the lugs are canted downwardly or toward the bottom of the box 7 to serve as stops. In connection with the lugs 20, a clamp or holding member 22 is provided, said member consisting of a U-shaped strip of material corresponding in size to the exterior dimension of the guard and having the inner faces of its end portions reduced to provide shoulders 23. The shoulders 23 are canted or beveled upwardly toward the upper edge of the clamp so as to conform to the canted or beveled faces 21 of the lugs. The end portions of the clamp are provided with openings adapted to register with openings provided in the lugs 20. A connecting bolt 24 is passed through said lugs and the clamp, a wing nut 25 being employed to urge the clamp into engagement with the lugs. It will thus be seen that the clamp may be readily swung upwardly above the plate, but is limited in its downward movement so that it cannot pass below the lower face of the plate. This is accomplished by the beveled faces 21 and 23 and at the same time prevents damage to the guard.

In assembling the device, the plate 13 is disposed upon the stuffing box 8 and the nut 11 is urged into engagement with the upper surface of the plate so as to not only hold the gauge glass 9 but to prevent movement of the plate 13. The plate 17 is secured in a similar manner, that is, it is urged into engagement with the stuffing box by means of the nut 10. If desired, an adjusting nut 26 may be disposed in engagement with the stuffing box 8 so as to permit the plate 13 to be adjusted or moved vertically. One end of the guard 12 is then placed within the channel 14 and the upper end engaged with the outer edge of the plate 17. The clamp 22 is then swung downwardly over the exterior face of the upper end of the guard and clamped to the guard by the adjustment of the nut 25.

From the foregoing it will be readily seen that this invention provides a novel guard or protector for gauge glasses which not only permits the gauge glass to be readily observed through the guard, but greatly reduces the possibility of injury by confining the explosion, upon breakage of the gauge glass, within the guard, the glass used in the formation of the guard being substantial enough to resist the force of explosion thereby preventing the broken gauge glass from being projected and causing injury, and at the same time confining the steam within the guard until the valves can be operated to shut off the steam and water. The openings in the plates 13 and 17 at the same time permit any water or steam that may accumulate within the guard to readily escape. After the valve has been operated, the clamp 22 may be readily swung upwardly and the guard removed to permit repair of the gauge glass. It is estimated that the removal of the guard from the plates can be accomplished in ten seconds. In addition to this, the structure of the protector is simple, and is such that it can be applied to the conventional form of gauge glass without requiring alteration of the supporting means of the gauge glass.

What is claimed is:—

1. A device of the character described comprising gauge glass supports, a holding member carried by one of the supports and having a channel or groove for the reception of one end of a transparent guard, a holding member carried by the remaining supporting member, a clamp movably connected to the last mentioned holding member and adapted to hold the opposite end of the transparent guard in engagement with the last mentioned holding member.

2. A gauge glass guard comprising a pair of gauge glass supporting members including gauge glass stuffing boxes, a plate disposed upon one of said stuffing boxes and having a channel disposed inwardly of its upper face and extending substantially around said plate, a U-shaped transparent guard member having one end disposed within said channel, a plate engaged with the stuffing box of the remaining gauge glass support and adapted to engage the inner face of the U-shaped guard, and a clamping member pivoted to said plate and adapted to engage the exterior face of said guard.

3. A gauge glass guard comprising a pair of gauge glass supporting members including gauge glass stuffing boxes, a plate disposed upon one of said stuffing boxes and having a channel disposed inwardly of its upper face and extending substantially around said plate, a U-shaped transparent guard member having one end disposed within said channel, a plate engaged with the stuffing box of the remaining gauge glass support and adapted to engage the inner face of the U-shaped guard, and a clamping member pivoted to said plate and adapted to engage the exterior face of said guard, each of said plates having a series of outlet openings.

4. A gauge glass guard embodying gauge glass supports including gauge glass stuffing boxes, a holding plate engaged with one of said stuffing boxes, and adapted to be secured to the support through the medium of the means for securing the gauge glass within the stuffing box, said plate having a U-shaped channel in its upper face, a U-shaped reinforced glass guard member having one end disposed within said channel, a holding plate engaged with the stuffing box of the remaining support and secured thereto by the securing means for holding the gauge glass within the stuffing box of said remaining support, the second mentioned plate being adapted to engage the inner surface of the opposite end of the guard, and a U-shaped clamp pivoted to one end of the second mentioned plate in spaced relation to the edge of said plate, said member being adapted to swing downwardly over the second mentioned end of the guard for clamping the guard to the second mentioned plate.

5. A gauge glass guard embodying gauge glass supports including gauge glass stuffing boxes, a holding plate engaged with one of said stuffing boxes, and adapted to be secured to the support through the medium of the means for securing the gauge glass within the stuffing box, said plate having a U-shaped channel in its upper face, a U-shaped reinforced glass guard member having one end disposed within said channel, a holding plate engaged with the stuffing box of the remaining support and secured thereto by the securing means for holding the gauge glass within the stuffing box of said remaining support, the second mentioned plate being adapted to engage the inner surface of the opposite end of the guard, and a U-shaped clamp pivoted to one end of the second mentioned plate in spaced relation to the edge of said plate, said member being adapted to swing downwardly over the second mentioned end of the guard for clamping the guard to the second mentioned plate, and stop means carried by the second mentioned plate and clamp to limit movement of the clamp beyond the end of the guard.

In testimony whereof I hereunto affix my signature.

CHRIS A. ANDERSON.